US007691462B2

(12) United States Patent
Erwin et al.

(10) Patent No.: US 7,691,462 B2
(45) Date of Patent: Apr. 6, 2010

(54) WIRE LABEL WITH CARRIER

(75) Inventors: Michael S. Erwin, Mukwonago, WI (US); James A. Petersen, Hartford, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 231 days.

(21) Appl. No.: 10/919,892

(22) Filed: Aug. 17, 2004

(65) Prior Publication Data

US 2006/0040084 A1 Feb. 23, 2006

(51) Int. Cl.

| | |
|---|---|
| ***B32B 9/00*** | (2006.01) |
| ***B32B 23/02*** | (2006.01) |
| ***B32B 7/14*** | (2006.01) |
| ***B32B 7/02*** | (2006.01) |
| ***G09C 3/00*** | (2006.01) |

(52) U.S. Cl. .................... 428/40.1; 428/42.2; 428/42.3; 428/438; 428/192; 428/194; 428/201; 428/203; 428/214; 428/42.1; 283/81

(58) Field of Classification Search ................ 428/40.1, 428/42.1, 42.2, 42.3, 138, 192, 194, 201, 428/203, 214, 438; 283/81
See application file for complete search history.

(56) References Cited

U.S. PATENT DOCUMENTS

| | | | | |
|---|---|---|---|---|
| 2,013,844 | A | 9/1935 | Sherman | |
| 2,058,035 | A | 10/1936 | Rand | |
| 2,201,950 | A | 5/1940 | Wolters et al. | |
| 2,217,506 | A | 10/1940 | Bottle | |
| 3,192,093 | A * | 6/1965 | Tobey | 156/352 |
| 3,339,828 | A | 9/1967 | Hiersteiner | |
| 3,894,731 | A | 7/1975 | Evans | |
| 3,985,852 | A | 10/1976 | Evans | |
| 4,032,010 | A | 6/1977 | Evans | |
| 4,070,223 | A | 1/1978 | Stalzer | |
| 4,191,405 | A | 3/1980 | Johnstun | |
| 4,198,451 | A | 4/1980 | Johnstun | |
| 4,206,909 | A | 6/1980 | Wintle | |
| 4,347,274 | A | 8/1982 | Janssen | |
| 4,349,404 | A | 9/1982 | Changani et al. | |
| 4,361,230 | A | 11/1982 | Downing et al. | |
| 4,363,401 | A | 12/1982 | Savagian | |
| 4,425,390 | A | 1/1984 | Changani et al. | |
| 4,442,939 | A | 4/1984 | Downing | |
| 4,448,558 | A | 5/1984 | Weingarten | |
| 4,461,793 | A | 7/1984 | Blok et al. | |
| 4,487,645 | A | 12/1984 | Weston | |
| 4,488,642 | A | 12/1984 | Changani et al. | |
| 4,517,044 | A * | 5/1985 | Arnold | 156/277 |
| 4,574,440 | A | 3/1986 | Wirth et al. | |

(Continued)

FOREIGN PATENT DOCUMENTS

| | | | |
|---|---|---|---|
| WO | WO 97/14126 | A1 | 4/1997 |

*Primary Examiner*—Victor S Chang
(74) *Attorney, Agent, or Firm*—Ryan Kromholz & Manion, S.C.

(57) ABSTRACT

A label assembly comprised of a carrier strip and a plurality of labels. The carrier strip comprises at least a first backing layer and a layer of adhesive material located over said first backing layer. A second backing layer may be located over said adhesive layer. Predetermined areas are removed from the second backing area to expose the adhesive layer, which allows the labels to be removably adhered to the carrier strip. Sections may be further cutout of the carrier strip for a dual-sided printing arrangement.

30 Claims, 7 Drawing Sheets

U.S. PATENT DOCUMENTS

| | | | | | |
|---|---|---|---|---|---|
| 4,586,610 | A | | 5/1986 | Gandolfo | |
| 4,655,129 | A | | 4/1987 | Wirth et al. | |
| 4,686,144 | A | | 8/1987 | Hupfer et al. | |
| 4,865,895 | A | | 9/1989 | Vlamings et al. | |
| 5,110,638 | A | | 5/1992 | Vogdes et al. | |
| 5,262,214 | A | * | 11/1993 | Instance | 428/42.1 |
| 5,788,796 | A | * | 8/1998 | Look et al. | 156/277 |
| 5,863,383 | A | | 1/1999 | Bussey | |
| 5,863,628 | A | * | 1/1999 | Barry | 428/40.1 |
| 6,103,051 | A | | 8/2000 | Bussey | |
| 6,120,637 | A | * | 9/2000 | Barry | 156/252 |
| 6,277,456 | B1 | | 8/2001 | Bulgrin et al. | |
| 6,962,014 | B2 | * | 11/2005 | McCabe et al. | 40/316 |
| 2003/0204006 | A1 | | 10/2003 | Moriuchi et al. | |
| 2005/0153113 | A1 | * | 7/2005 | Hseih et al. | 428/201 |

* cited by examiner

*Fig. 3*
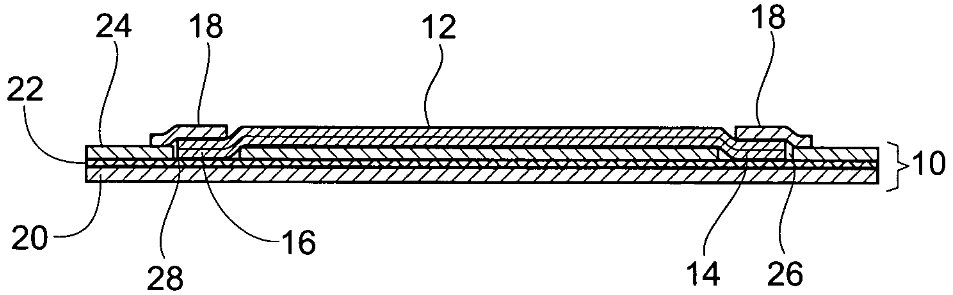
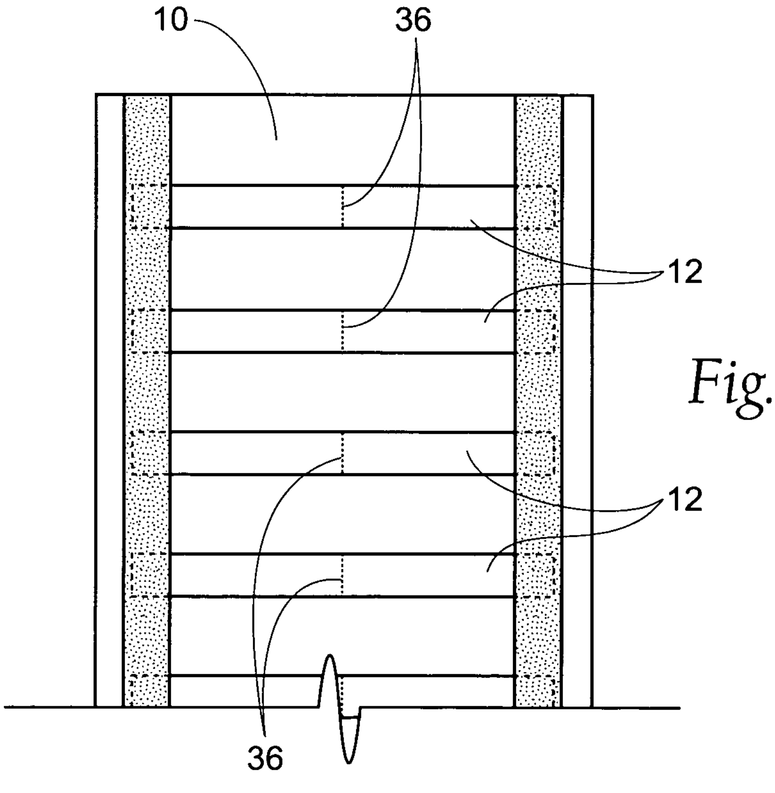
*Fig. 4*

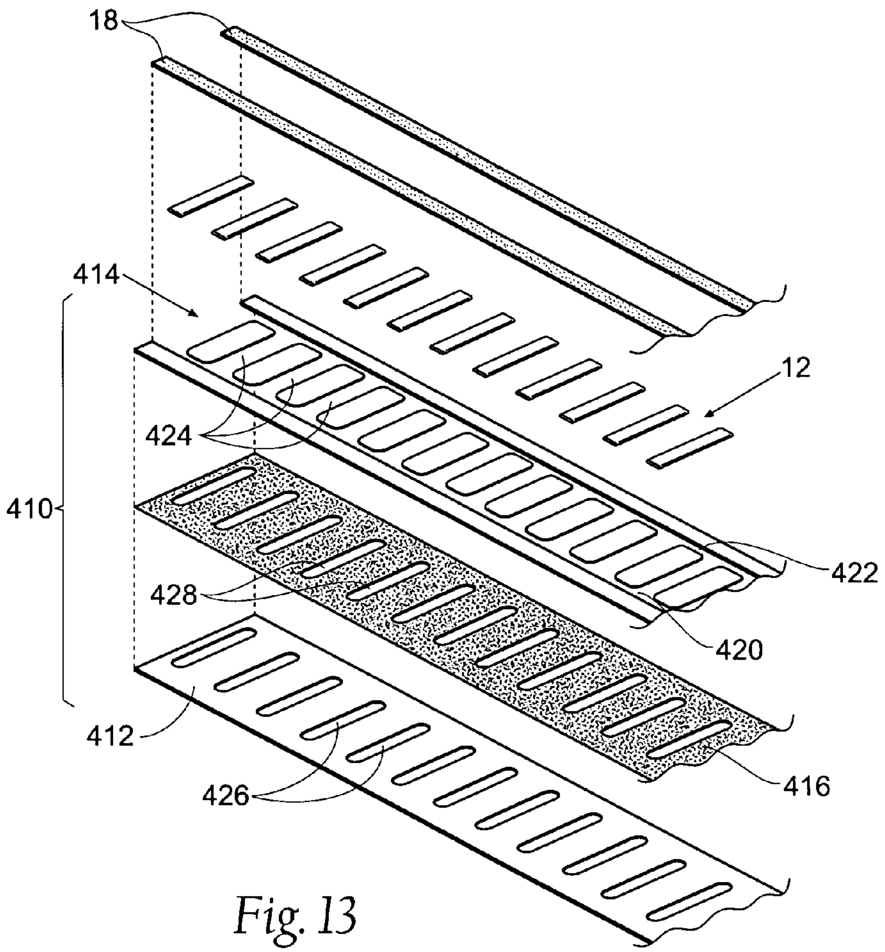
Fig. 13
Fig. 14
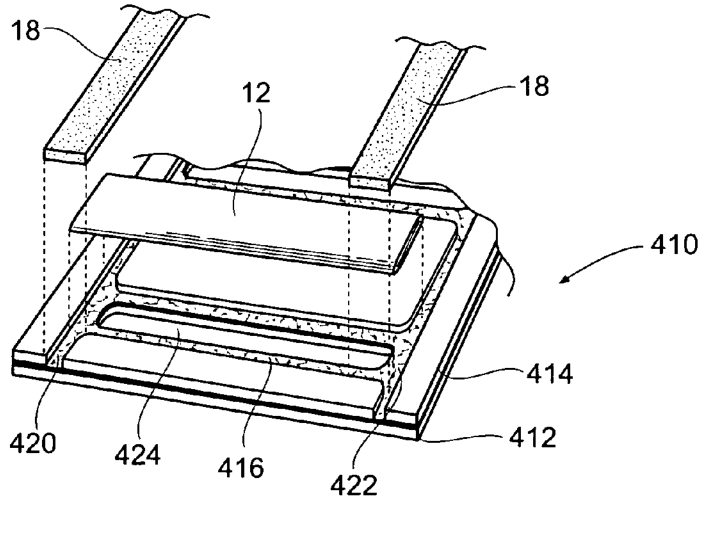

WIRE LABEL WITH CARRIER

BACKGROUND OF THE INVENTION

The present invention relates to labeling devices, and, more specifically, to labeling devices used in connection with electronic printing devices.

In devices or equipment, such as in airplanes, boats, computer networks or equipment that contains many wires, cables, or other items that may either get easily tangled or confused with other similar items, it is necessary to label the wires, cables or groups of cables of wires. Tags and marker assemblies have been designed to form labels for such uses. Heat shrink technology has been employed in making these markers and tags thereby permitting easy installation. Once applied, the labels are difficult to remove.

Generally, a carrier strip of material containing a plurality of markers is fed through a machine, whereby the markers will pass through a printing station for imprinting images onto each marker. Previous designs for carrying out the process utilize carrier strips that are bulky and not adapted for use in different types of printers. Such carriers tend to be stiff, which may cause the images printed on the markers to be distorted. Further, the stiff material may not be easily moved through the printer, since the carrier may have to negotiate curves or bends within the assembly.

Likewise, stiffer material is generally more expensive to produce and may need to be wider than necessary so that there is a sufficient area to move and rotate the carrier. For instance, many current carrier strip designs are track driven or use pin feeds for the carriers' movement. This may require a wider strip, which also adds to the cost of the material needed for producing the carrier strips.

U.S. Pat. No. 6,277,456 to Bulgrin, et al., discloses a label assembly where the labels carried by the carrier strip are integral with the carrier strip. A die cutting process that also cuts away portions of the carrier strip defines the labels. Tack points remain in the die cutting process to keep the labels connected to the carrier strip. The carrier strip is relatively thick and stiff and may not be easily fed through certain printers.

U.S. Pat. No. 4,865,895 to Vlamings et al., discloses a marker sleeve assembly wherein the labels are attached and adhered to a stiff, relatively thick carrier strip by placing the labels between the edges of two layers material. The labels are attached to the inner edge of the carrier strip and care must be taken to properly align the labels with the carrier strip. For instance, the labels must be positioned properly so that they are not too close or too far away from the carrier strip so that the labels will properly fit within a printing assembly and, also, that they are not positioned too close together for proper printing. This is especially true for a pin feed-type drive, where registration is based on the pin feed.

A new carrier strip for a printing assembly is desired that will provide the needed support for the labels, while providing a high degree of flexibility for the carrier strip for use in printing machines. The carrier strip should also allow the labels to be adjoined to the carrier strip in an efficient and relatively straightforward registration process.

SUMMARY OF THE INVENTION

The present invention discloses a carrier strip for labels used in printing machines and assemblies and a method for manufacturing the carrier strip. The carrier consists of a first and second backing layer adhered to one another, sandwiching the adhesive between the two baking layers. Predetermined areas will be removed from the second backing layer to thereby expose the adhesive. The predetermined areas are located on opposing sides of the carrier, corresponding to the ends of the labels placed on the carrier strip. Once the labels are placed over the carrier strip, a layer of adhesive tape will be placed over the predetermined areas, preferably covering up any exposed adhesive located in the predetermined areas.

The carrier strip layers are preferably made of a polyethylene material, with each of the layers preferably having a thickness of less than 3 mils. The overall thickness of the carrier strip is preferably less than 7 mils, which is a significant improvement over thicknesses of previous carrier strips. The present carrier strip allows for easier feeding and movement within a printing station or assembly, especially when the carrier strip must move over a curved area or corner in the printing assembly. The carrier strip also allows for easier printing on the labels, since the flexibility of the carrier strip will minimize bowing of the labels and the strip. The carrier strip is thinner than previous designs, yet still provides a sufficient support structure for use in typical printing assemblies. The carrier strip, including the exposed adhesive, combined with the labels, creates a unitary structure that is rigid and supportive for the printing process.

The present invention also has the advantage of not needing holes or openings, referred to as pin feeds, in the carrier strip for feeding and moving within the printing assembly. The carrier strip may be fed through a printing machine more efficiently than other designs and will also require less mass of material overall for the carrier strip design. Thus, the labels may cover a larger width of the carrier strip, which provides for more printing area on the labels proportionately to the size of the carrier strip.

The present invention may also be arranged for dual-sided printing processes. The carrier strip will have further predetermined areas that are cut away from the carrier strip, forming a window on the underside of the carrier strip. The cut away areas will substantially underlie an intermediate portion of the labels, which corresponds to an area where printing is desired on the labels. These and other advantages will be further described in the detailed description and the drawings.

BRIEF DESCRIPTION OF THE DRAWINGS

FIG. 3 is a cross-sectional view of the carrier strip taken along line 3-3 of FIG. 1.

FIGS. 4, 5A, and 5B are sectional top plan views of carrier strips containing labels marked for specifically dimensioned labels.

FIG. 13 is an exploded perspective view of the carrier strip in FIG. 12.

FIG. 14 is an enlarged partially exploded perspective view of the carrier strip shown in FIG. 12.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
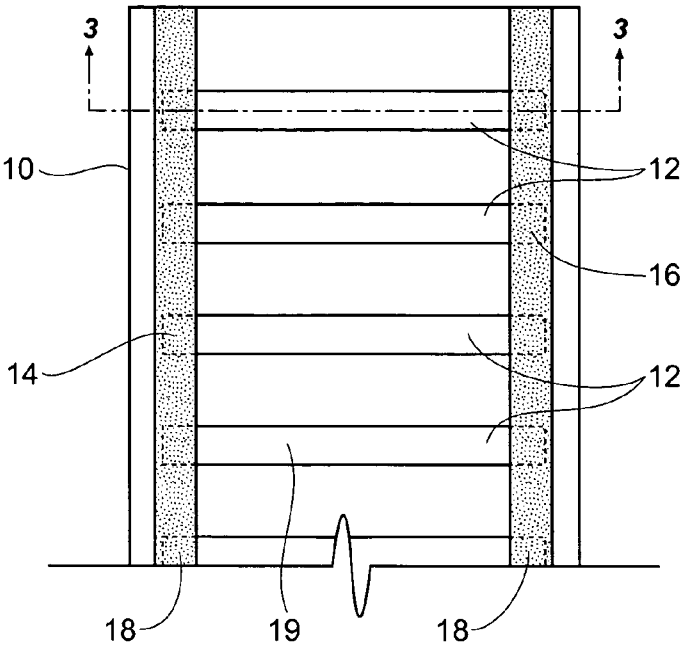
FIG. 1 depicts a sectional top plan view of a carrier strip in accordance with the present invention.

FIG. 1 shows a sectional top plan view of a carrier strip 10 and a plurality of labels 12 that are adhered on top of the carrier strip 10. Like parts will be referred to with like reference numerals. The labels 12 have a first end 14 and a second end 16 and are arranged substantially laterally to the carrier strip 10. The spacing and size of the labels 12 may be of any desired size or orientation. The labels 12 are preferably longitudinally spaced from one another at equal intervals. A pair of adhesive tapes 18 has been placed respectively over the first end 14 and the second end 16 of the labels 12. An intermediate portion 19 of the labels 12 is not adhered to the carrier strip 10 and the labels 12 are free to flex as necessary within a printing device.

Figure 2:
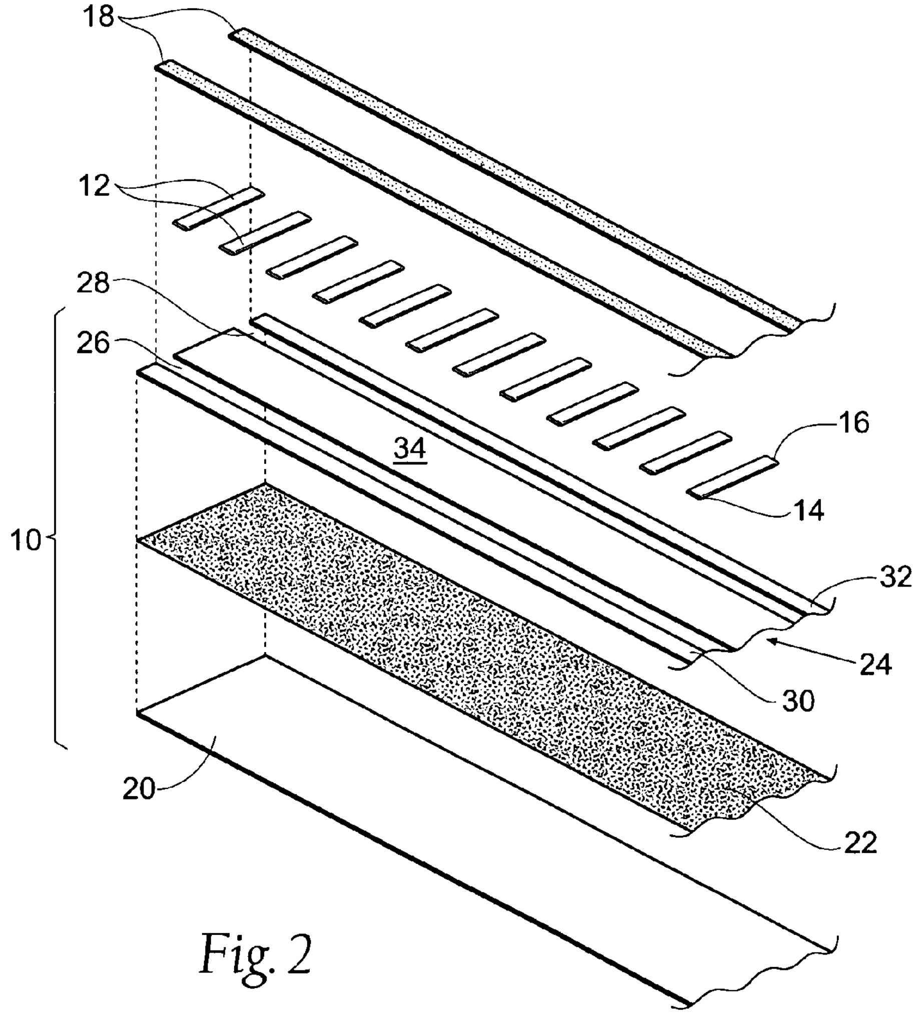
FIG. 2 is an exploded perspective view of a carrier strip in accordance with the present invention.

FIG. 2 is an exploded perspective view of a partial section of the carrier strip 10. The carrier strip 10 generally is comprised of three sections: a first backing layer 20, an adhesive layer 22, and a second backing layer 24. The adhesive layer 22 will preferably cover the entire first backing layer 20. The first backing layer 20 and the second backing layer 24 preferably are of the same overall width and length. A first predetermined area 26 and a second predetermined area 28 will be removed from the second backing layer, with the areas preferably formed by a die cutting process. The adhesive layer 22 is exposed within the areas 26 and 28, which provides areas for the labels 12 to be adhered to the carrier strip 10. The predetermined areas 26 and 28 are preferably transverse of the width of the carrier strip 10, underlying the ends 14 and 16 of the label 12.

Still referring to FIG. 2, the predetermined areas 26 and 28 will divide the second backing layer 24 into a first edge section 30, a second edge section 32 and a central section 34. The predetermined areas 26 and 28 provide an area for the label 12 ends 14 and 16 to be removably secured to the adhesive layer 22, securing the labels 12 to the carrier strip 10. The labels 12 are placed over the second backing layer 24, with the strips of adhesive tape 18 being placed over the ends 14 and 16, which can assist in further securing the labels 12 to the carrier strip 10 as the tapes 18 cover the predetermined areas 26 and 28. The carrier strip 10 will be preferably be as wide as the entrance slot of a printing station (not shown), with the first and second edge sections 32 and 34 interacting with the feeding means of the printing assembly. The carrier strip 10 does not require feedholes or apertures as needed in the prior art for interacting with a sprocket drive of a printing machine. Thus, less material is needed for the carrier strip 10, which results in a more cost-efficient process compared to the prior art. Also, the labels 12 may encompass a wider section of the width of the carrier strip 10 than previous designs, which allows for a larger printing area for the labels 12 relative to the size of the carrier strip 10. Overall, the width of the labels 12 may be varied by adjusting components of the carrier strip 10 to repeat the label design using the adjusted width.

FIG. 3 shows an enlarged cross-sectional view of the carrier strip 10 taken along the line 3-3 of FIG. 1. As previously discussed, the carrier strip 10 comprises the first backing layer 20, the second layer 24, and the adhesive layer 22. The label 12 is placed over the carrier strip 10, with the first end 14 and the second end 16 located over the first predetermined area 26 and the second predetermined area 28, respectively. The labels 12 and the adhesive layer 22 may be arranged so that the labels 12 are sufficiently adhered to the carrier strip 10. However, placement of the adhesive tapes 18 over the label ends 14 and 16 further secures the labels 12 to the carrier strip 10 and preferably covers all of the exposed adhesive layer 22 within the first and second predetermined areas, 26 and 28. The tapes 18 have sufficient adhesive qualities so that they will remain on the carrier strip 10 until it is desired to remove the labels 12. Further, the tapes 18 preferably are designed so that they may be removed and refastened to the carrier strip 10 and the labels 12, if necessary. Because of the enlarged view, the ends 14, 16 of the labels 12 are shown as being bent more than normally will occur. FIG. 3 is used as an example of the layers of the carrier strip 10, and not necessarily how the labels 12 spatially will rest upon the carrier 10.

Figure 5A:
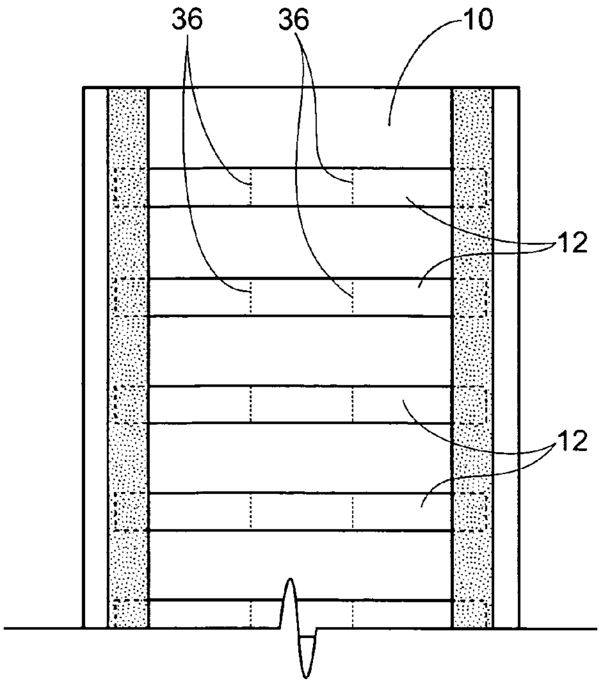

FIGS. 4 and 5A show further top plan views of the carrier strip 10 and the labels 12. The labels 12 have label markings 36 to provide for printing more than one set of information on each of the labels 12, dividing the label 12 into multiple individual labels. For instance, the label markings 36 in FIG. 4 provide for two sets of information (and two individual labels) on each of the labels 12, and the markings 36 in FIG. 5A provide for three sets of information (and three individual labels). The markings 36 are preferably rows of perforations, thereby allowing the individual labels to be separated after printing. The markings 36 may be utilized in any embodiments that fall within the scope of the present invention.

Figure 5B:
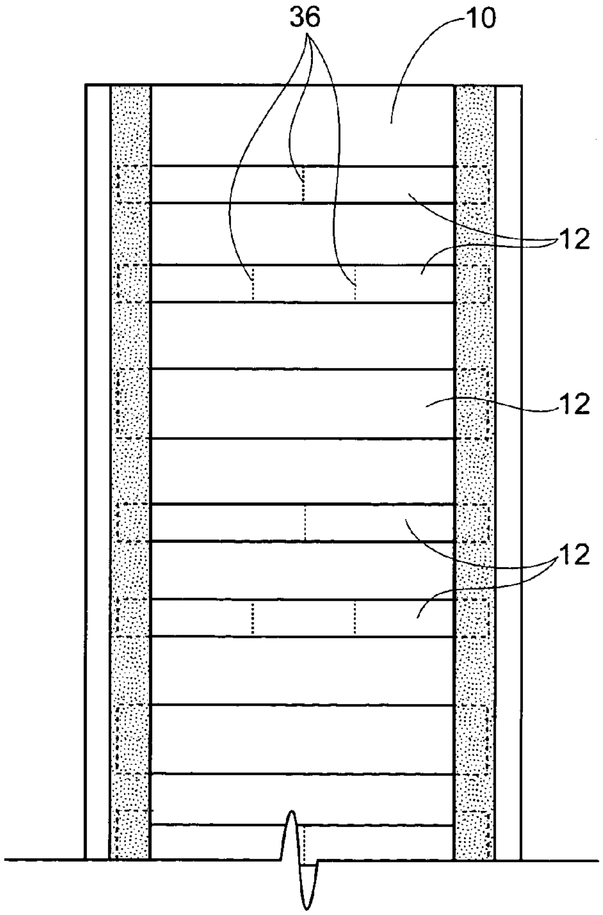

FIG. 5B shows a top plan view of a further arrangement of the carrier strip 10 and the labels 12. Through the use of special perforation and die cut tooling, the combination of label sets can alternate. For instance, one label 12 may have one label marking 36, another may have two markings 36, and a third may have no markings. Likewise, as shown, the labels 12 may be of varying sizes on the same carrier strip 10. It is possible to have many combinations of labels 12 and markings 36 on the same carrier strip 10. In essence, it is possible to create an individualized kit to be used for specific applications.

Figure 6:
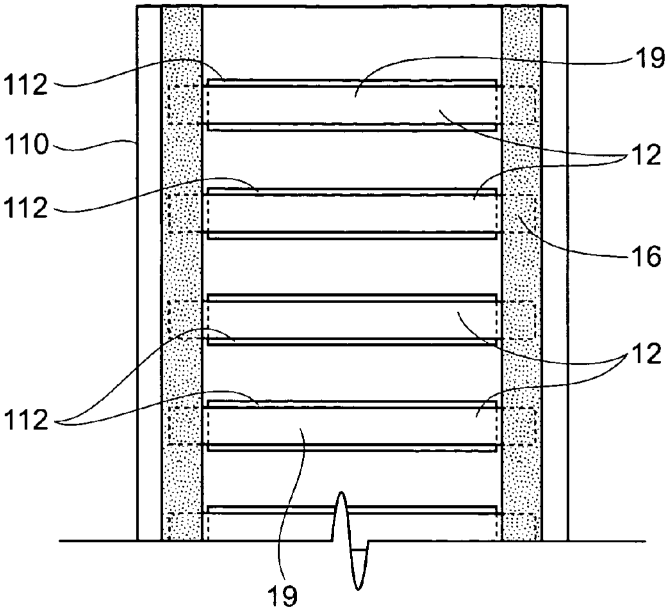
FIG. 6 is a sectional top plan view of an alternate embodiment of a carrier strip in accordance with the present invention.

FIG. 6 provides a sectional top plan view of a further embodiment of a carrier strip 110 according to the present invention. The carrier strip 110 is similar to the carrier strip 10, except it is arranged for printing on both sides of the labels 12. The carrier strip 110 has a plurality of spaced apart apertures or windows 112 that allow for dual-sided printing. The apertures 112 preferably are aligned centrally of the intermediate portions 19 of the labels 12, thereby exposing the labels 12 on two sides. The labels 12 will be adhered and arranged on the carrier strip 110 as the labels 12 were previously arranged on the carrier strip 10 (see FIG. 1).

Figure 7:
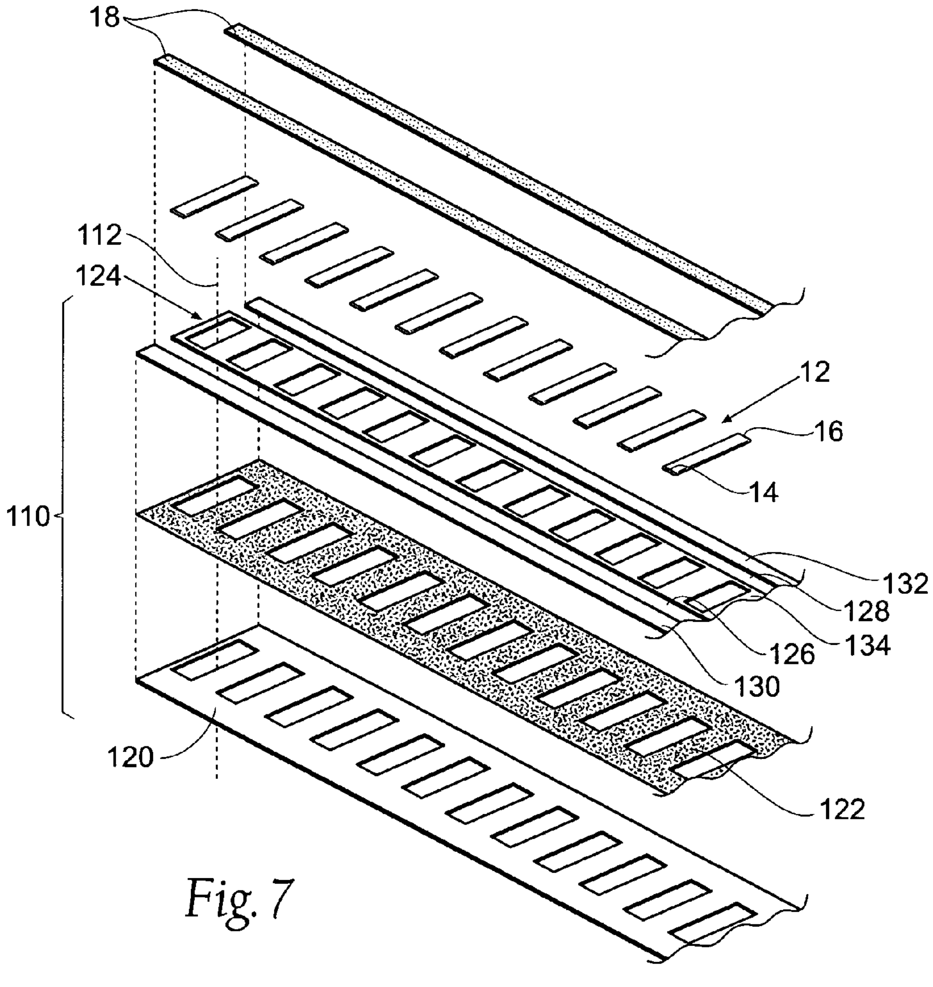
FIG. 7 is an exploded perspective view of the carrier strip of FIG. 6.

FIG. 7 provides an exploded perspective view of the carrier strip 110. The carrier strip 110 comprises a first backing layer 120, an adhesive layer 122, and a second backing layer 124. The second layer 124 has a first predetermined area 126 and a second predetermined area 128 that divide the carrier strip 110 into a first edge section 130, a second edge section 132, and a central section 134. The apertures 112 are located in the central section 134, with the apertures 112 preferably aligned on the first backing layer 120 and the second backing layer 124. The labels 12 further will be secured to the adhesive layer 122 with the tapes 18 overlying the ends 14 and 16 of the labels 12, as in the previous embodiment. The apertures 112 may be formed with a diecutting process, and may be formed before or after the first backing layer 120 and the second backing layer 124 are secured together. When the labels 12 are fed through a printing assembly (not shown), opposing sides of the flattened labels 12 are exposed to the printing assembly, which allows for printing on either or both sides of the labels 12.

Figure 8:
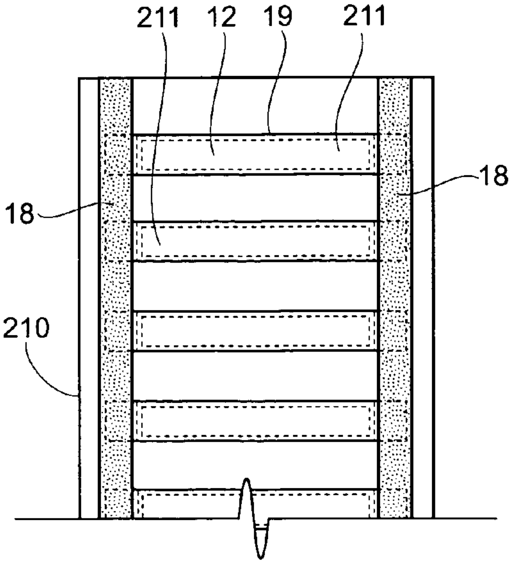
FIG. 8 is a sectional top plan view of a further embodiment of a carrier strip in accordance with the present invention.

FIG. 8 shows a sectional top plan view of a further embodiment of a carrier strip 210 according to the present invention. The carrier strip 210 provides for two-sided printing for the labels 12. The labels 12 are arranged on the carrier strip 210 similarly to the above-described embodiments, with the labels 12 further being adhered to the carrier strip 210 with the tapes 18. A plurality of openings 211 (shown in phantom) is located below the intermediate portion 19 of the labels 12. The openings 211 will be arranged so that they are smaller than the apertures 112 in the second embodiment, above (see FIG. 6).

Figure 9:
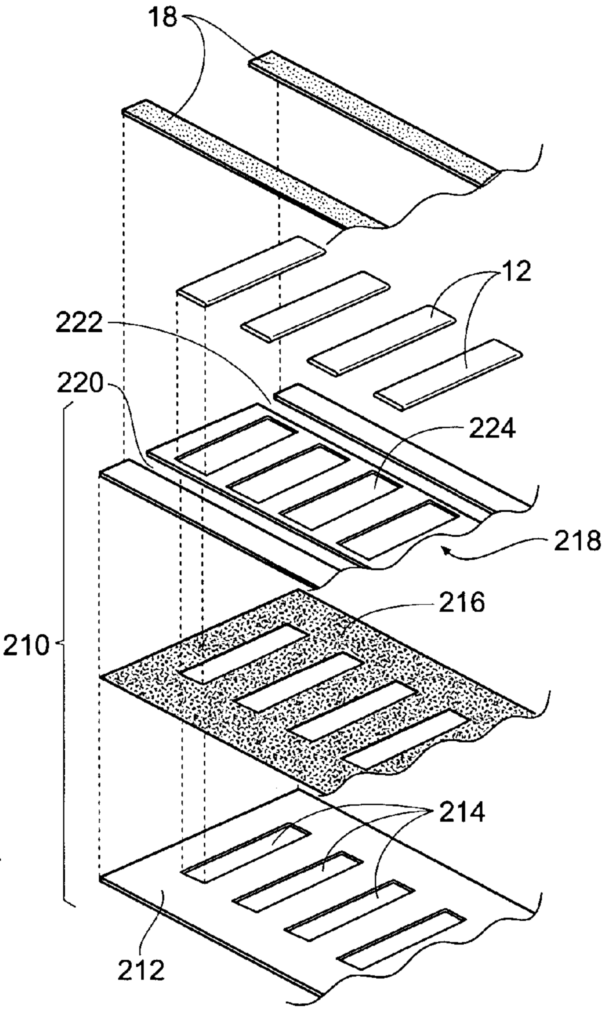
FIG. 9 is an exploded perspective view of the carrier strip shown in FIG. 8.

FIG. 9 shows an exploded perspective view of the carrier strip 210. A first backing layer 212 having a first cutout section 214 provides the base for the carrier strip 210. An adhesive layer of material 216 is located over the first backing layer 212, with a second backing layer 218 located over the adhesive layer 216. The first cutout section 214 essentially will be void of the adhesive material 216. A first predetermine area 220 and a second predetermined area 222 (see FIG. 10) will be removed from the second backing layer 218, similar to the above embodiments. The second backing layer 218 further includes a second cutout section 224. The second cutout section 224 preferably is larger than the first cutout section 214. The labels 12 are preferably aligned with the first cutout section 214 and the second cutout section 224, and are adhered to the carrier strip 210 with the tapes 18.

Figure 10:
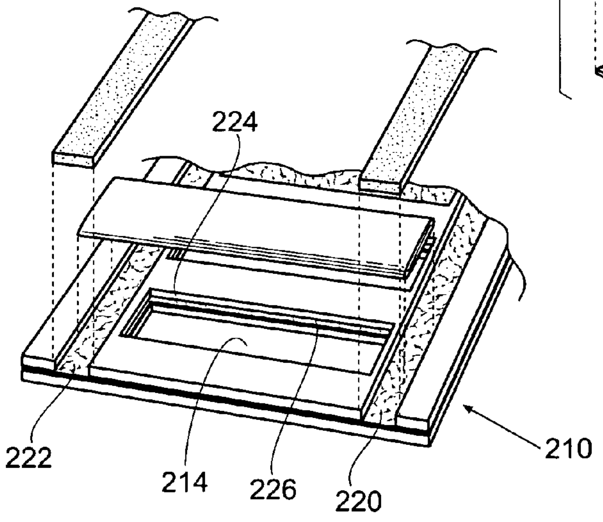
FIG. 10 is an enlarged partially exploded perspective view of the carrier strip shown in FIG. 8.

FIG. 10 shows a partially exploded perspective view of the carrier strip 210. As discussed with respect to FIG. 9, the second cutout section 224 is preferably larger than the first cutout section 214. The first cutout section 214 has a marginal surface area 226, which is defined by the extent of the second cutout section 224. However, when referring to the second cutout section 224 as larger than the first cutout section 214, it should be understood this refers to the second cutout section defining the marginal section 226, since it would be possible for the second cutout section 224 to have a smaller overall area than the first cutout section 214 and still define the marginal section 226. Such an arrangement would still fall within the scope of the present invention. The adhesive layer of material 216 covers the marginal surface area 226, and the labels 12 will adhere to the marginal surface area 226, which will provide further structure and support for the labels 12 as they travel through a printing machine or assembly. The marginal surface area 226 may be of any size that will not interfere with ability of a printing machine to print on both sides of the labels 12. The first cutout section 214 and the second cutout section 224 preferably are of the same shape and aligned centrally with each other, thereby having proportional dimensions. The labels 12 are also preferably aligned with the respective cutout sections 214 and 224.

Figure 11:
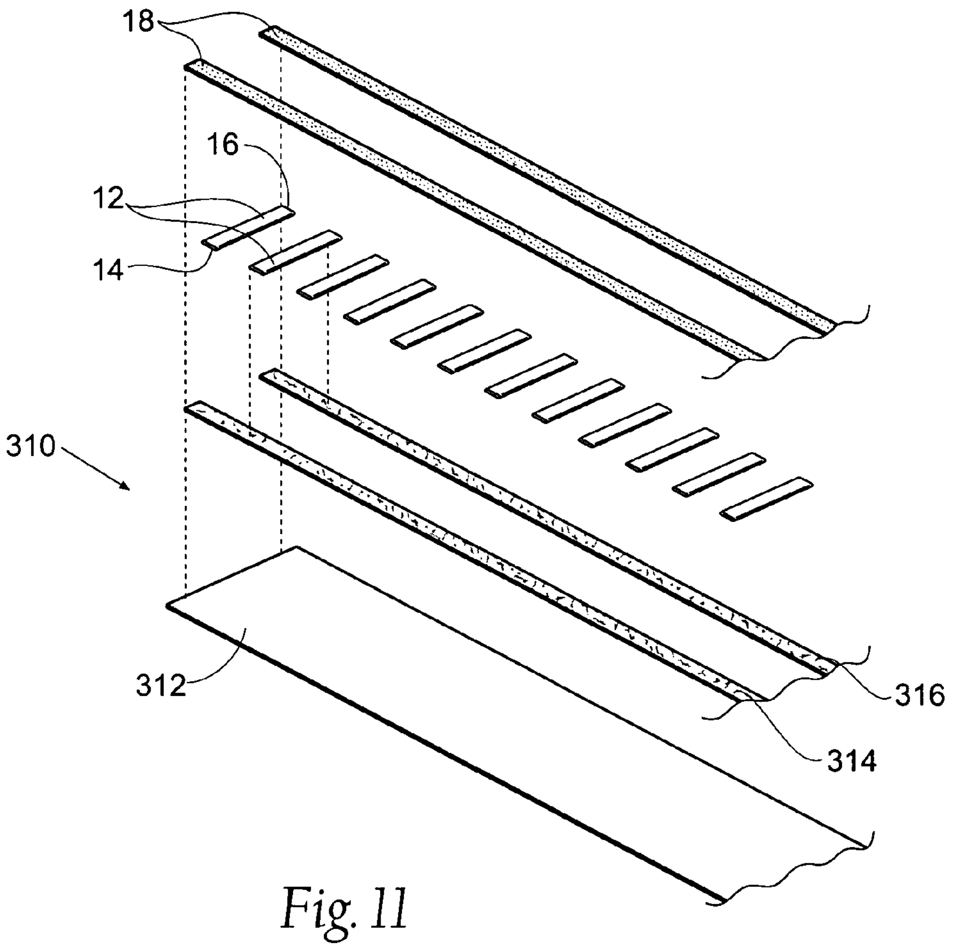
FIG. 11 is an exploded perspective view of a further alternate embodiment of a carrier strip in accordance with the present invention.

FIG. 11 shows an exploded perspective view of a further alternative embodiment of a carrier strip 310 according to the present invention. The carrier strip 310 is composed of a single backing layer of material 312. A first predetermined area of adhesive material 314 and a second area of adhesive material 316 are layered over the baking layer 312 at opposing sides of the backing layer 312, preferably arranged in strips coextensive with the length of the carrier strip 310. The first end 14 and the second end 16 of the labels 12 will be placed over the first predetermined area 314 and the second predetermined area 316, respectively. The tapes 18 are placed over the ends 14 and 16 to overlap the predetermined areas 314 and 316 and further secure the labels 12 to the carrier strip 312.

Figure 12:
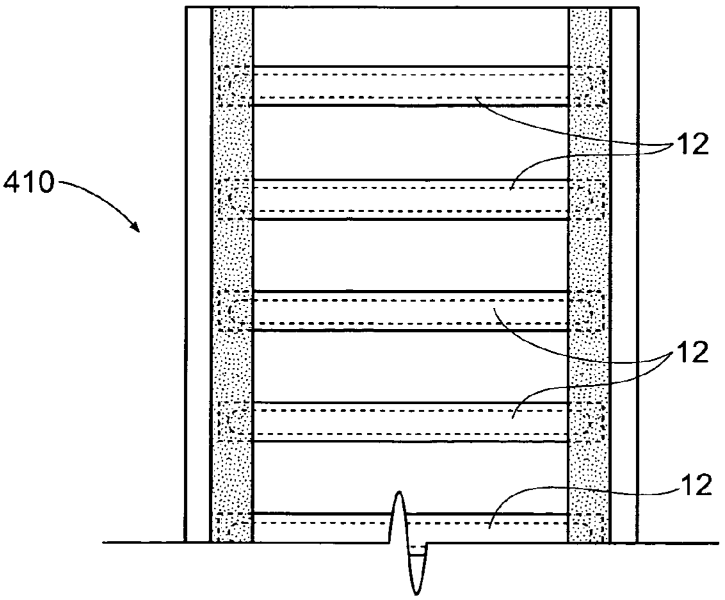
FIG. 12 is a sectional top plan view of another further alternate embodiment of a carrier strip in accordance with the present invention.

FIG. 12 shows an overhead view of an even further embodiment of a carrier strip 410. The carrier strip 410 provides another arrangement for the labels 12 to be adhered to the carrier strip 410. As shown in the views of FIGS. 13 and 14, the carrier strip 410 has a first backing layer 412 and a second backing layer 414. A layer of adhesive material 416 is sandwiched between the backing layers 412 and 414. The carrier strip 410 is similar to the carrier strip 210 shown in FIGS. 8 and 9 except that a single die cut will remove a first predetermined area 420, a second predetermine area 422, and a central cutout portion or central cutout portions 424, thereby exposing the adhesive material 416. The cutout sections 420, 422, and 424 preferably will, in essence, make up a single cutout area, having a ladder-shaped cutout area. The carrier strip 410 provides for more of the label 12 to come in contact with the adhesive material 416, preferably having the adhesive material 416 contacting the label 12 on all four edges or dimensions of the label 12. That is, a marginal area will be located on all sides of the label 12. The carrier strip 410 may be designed for single-sided or dual-sided printing, as previously discussed with respect to the other embodiments. For dual-sided printing, apertures 426 located in the first backing layer 412 and apertures 428 located in the adhesive layer are preferably the same size. Also, the central cutout portions 424 are larger than the apertures 426 and 428, thereby providing the adhesive marginal area for securing the labels 12. The carrier strip 410 allows either printing arrangement, while maintaining an adhesive border around all four edges of the label or labels 12. As previously discussed, the area of the adhesive material 416 that comes in contact with the labels 12 may be adjusted as desired. Depending on factors, such as the size of the labels or the speed the labels are fed through a printing assembly, the amount of the labels 12 that comes in contact with the adhesive material 416 can be adapted for specific needs.

The sections and areas removed from the described embodiments are preferably formed using a die cutting process. For example, referring to FIG. 9, the carrier strip 210 is shown. The adhesive layer 216 is adhered to the first backing layer 212. A die cutting machine may then be used to remove the first cutout section 214. Likewise, a die cutting process may be utilized to remove the first and second predetermined areas 220, 222, and the second cutout section 224 from the second backing layer 218. The second backing layer 218 may have the noted sections 220, 222, and 224 removed before or after the second backing layer 218 is placed on and adhered to the first layer 212 and the adhesive layer 216. If the sections 220, 222, and 224 are cut after adhering the layer 218 to the layers 212 and 216, any utilized cutting means should be designed so that only the second layer 218 will be severed by the cutting means, and the first layer 212 remains in tact.

Furthermore, the dimensions shown and described for the removed sections may be adapted and still fall within the scope of the invention. The predetermined areas where the labels are adhered to the carrier strip are shown generally as being coextensive with the length of the label assemblies (see FIGS. 2, 7, and 9). However, the predetermined areas could be formed to more closely correspond with the ends of the labels.

That is, a series of individual cutout sections approximate to the size of the ends of the labels could be formed, instead of one long area along each side of the carrier strips.

The present invention provides a flexible carrier strip that provides sufficient support for the labels 12 as they are fed through a printing assembly. The two backing layers that make up the carrier strip are preferably made from a clear material, such as a clear polyethylene material. The use of a clear material allows a printing assembly to advance and move the labels 12 when printing, without needing timing marks located on the carrier strip, as was necessary in previous carrier strip designs. Also, the flexibility of the carrier strip design allows for more labels to be placed on the carrier strip than a prior art carrier strip of the same dimensions, due to the label accomplishing the timing function for forwarding the carrier strip 10, which will provide for a more efficient and cost-effective process.

The present invention also provides a carrier strip that will be substantially thinner than previous carrier strips. For example, the carrier strip, as previously noted, may be formed of layers of clear polyethylene material. The polyethylene material generally has a thickness of about between 1.5-3 mils. The layer of adhesive material preferably will have a thickness of between 0.8-1.0 mils. The overall thickness of the carrier strip is less than 7 mils, and more approximately between 3.5-6 mils. In the embodiment using a single layer of material, the single layer should be approximately as thick as the two layers used in the other noted embodiments. This is a significant advantage over previous carrier strip designs. The relatively thin carrier strip is more flexible over previous designs, which makes it easier for the strip to navigate through a printing assembly and still maintain sufficient contact between the labels and a print head located within the printing assembly.

The dimensions of the carrier strip are determined by the specific printing assembly and the desired label length, and are not a limitation upon the carrier strip. That is, the carrier strip maybe adapted to be used in a wide range of printing assemblies. However, the design of the present invention provides for a more efficient use of the printing area located on the labels in comparison to the overall size of the carrier strip. As previously noted, the carrier strip does not need feed holes or apertures for the carrier strip to be fed through within a printing assemble, which means the labels may extend farther across the width of the carrier strip than in previous designs.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A label assembly comprising:

a carrier strip, said carrier strip comprising:

- a first backing layer;
- a layer of adhesive material located over said first backing layer;
- a second backing layer located over said adhesive layer;
- a first predetermined opening located on said second backing layer, said opening exposing said adhesive layer; and
- a label having a first end and a second end, said first end of said label overlying and removably adhering to said first predetermined area; and
- a first adhesive tape, said first adhesive tape overlying said first end of said label and said first predetermined opening, said adhesive tape further substantially covering said exposed layer of adhesive material.

2. The label assembly according to claim 1, wherein said carrier strip further comprises a second predetermined area, said second predetermined area being removed from said second backing area to thereby expose said adhesive layer, said second end of said label overlying and removably adhering to said second predetermined area.

3. The label assembly according to claim 2, further comprising:

a second adhesive tape overlying said second end of said label and said second predetermined area, said adhesive tape further substantially covering said exposed layer of adhesive material.

4. The label assembly according to claim 3, wherein said first and said second predetermined areas being substantially coextensive with the length of said label assembly.

5. The wire label assembly according to claim 4, further comprising a plurality of said labels being adhered to said carrier strip.

6. The label assembly according to claim 1, wherein said first and said second backing layers are substantially the same size.

7. The label assembly according to claim 1, wherein said carrier strip has a thickness of less than 15 mils.

8. The label assembly according to claim 7, wherein said carrier strip has a thickness of less than 7 mils.

9. The label assembly according to claim 1, wherein said carrier strip comprises a transparent material, thereby allowing said label to serve as a printer advancement mark.

10. A label assembly for dual-sided printing comprising:

a carrier strip, said carrier strip comprising:

- a first backing layer;
- a layer of adhesive material located over said first backing layer;
- a second backing layer located over said adhesive layer;
- a first predetermined opening located on said second backing layer, said first opening exposing said adhesive layer; and
- a second predetermined opening located on said second backing layer, said second opening exposing said adhesive layer;
- a label having a first end portion, a second end portion, said, said label having at least one perforation, said label an intermediate portion, said label being located on said carrier strip, said first end of said label overlying and removably adhering to said first predetermined opening;
- an aperture extending between said first and second label ends, said aperture underlying said intermediate portion of said label.

11. The assembly according to claim 10, further comprising a first adhesive tape, said first adhesive tape overlying said first end portion of said label and said first predetermined opening, said adhesive tape further adhering said label to said carrier strip.

12. The assembly according to claim 11, further comprising a second adhesive tape, said second adhesive tape overlying said second end portion of said label and said second predetermined opening, said adhesive tape further adhering said label to said carrier strip.

13. The label assembly according to claim 10, wherein said first and said second predetermined openings are substantially coextensive with the length of said label assembly.

14. The label assembly according to claim 13, further comprising a plurality of said labels being adhered to said carrier strip, said intermediate portions of said labels being located over a plurality of respective apertures.

15. The label assembly according to claim 10, wherein said carrier strip has a thickness of less than 15 mils.

16. The labels assembly according to claim 15, wherein said carrier strip has a thickness of less than 7 mils.

17. The label assembly according to claim 10, wherein said carrier strip further comprises a transparent material.

18. A label assembly for dual-sided printing comprising:

a carrier strip, said carrier strip comprising:

a first backing layer having a first cutout section including a marginal surface area;

a layer of adhesive material overlying said first backing layer;

a second backing layer overlying said adhesive layer, said second backing layer having a second cutout section defining the extent of said marginal surface area;

a first predetermined opening located on said second backing layer, said first opening exposing said adhesive layer; and a second predetermined opening located on said second backing layer, said second opening exposing said adhesive layer;

a label having a first end portion, a second end portion, and an intermediate portion, said label having at least one perforation said label being located on said carrier strip, said first end of said label overlying and removably adhering to said first predetermined opening;

said intermediate portion of said label substantially overlying said first and said second cutout sections, said intermediate portion having a portion removably adhered to said marginal surface area.

19. The label assembly according to claim 18, wherein said first cutout section and said second cutout section have proportional dimensions.

20. The assembly according to claim 18, further comprising a first adhesive tape, said first adhesive tape overlying said first end portion of said label and said first predetermined opening, said adhesive tape further adhering said label to said carrier strip.

21. The assembly according to claim 20, further comprising a second adhesive tape, said second adhesive tape overlying said second end portion of said label and said second predetermined opening, said adhesive tape further adhering said label to said carrier strip.

22. The label assembly according to claim 18, wherein said first and said second predetermined openings are substantially coextensive with the length of said label assembly.

23. The label assembly according to claim 22, further comprising a plurality of said labels being adhered to said carrier strip, said labels overlying a plurality of corresponding marginal surface areas.

24. The label assembly according to claim 18, wherein said carrier strip has a thickness of less than 15 mils.

25. The label assembly according to claim 24, wherein said carrier strip has a thickness of less than 7 mils.

26. The label assembly according to claim 18, wherein said carrier strip comprises a transparent material.

27. The label assembly according to claim 18, wherein said marginal surface area surrounds said label.

28. A label assembly comprising, a carrier strip, said carrier strip comprising:

a first backing layer;

a layer of adhesive material located over said first backing layer, said adhesive layer comprising a first predetermined area and a second predetermined area;

a label having a first end and a second end, and having at least one perforation, said label being located on said carrier strip, said first end of said label overlying and removably adhering to said first predetermined area, said second end overlying and removably adhering to said second predetermined area; and a pair of adhesive tapes, said adhesive tapes overlying a respective end of said labels.

29. The label assembly according to claim 28 wherein said carrier strip is transparent.

30. The label assembly according to claim 28, wherein said carrier strip has a thickness of less than 15 mils.

* * * * *